United States Patent
Sasaki et al.

(10) Patent No.: US 10,259,944 B2
(45) Date of Patent: Apr. 16, 2019

(54) SILICA FINE POWDER AND USE THEREOF

(71) Applicant: DENKA COMPANY LIMITED, Tokyo (JP)

(72) Inventors: Shuji Sasaki, Fukuoka (JP); Junya Nitta, Fukuoka (JP); Takahisa Mizumoto, Fukuoka (JP)

(73) Assignee: DENKA COMPANY LIMITED, Tokyo (JP)

( * ) Notice: Subject to any disclaimer, the term of this patent is extended or adjusted under 35 U.S.C. 154(b) by 0 days.

(21) Appl. No.: 15/325,352

(22) PCT Filed: Jul. 24, 2015

(86) PCT No.: PCT/JP2015/071159
§ 371 (c)(1),
(2) Date: Jan. 10, 2017

(87) PCT Pub. No.: WO2016/013673
PCT Pub. Date: Jan. 28, 2016

(65) Prior Publication Data
US 2017/0198147 A1 Jul. 13, 2017

(30) Foreign Application Priority Data
Jul. 24, 2014 (JP) .................. 2014-151018

(51) Int. Cl.
C09C 1/30 (2006.01)
B01J 2/04 (2006.01)
G03G 9/097 (2006.01)
C01B 33/18 (2006.01)
G03G 9/08 (2006.01)

(52) U.S. Cl.
CPC ............. C09C 1/3081 (2013.01); B01J 2/04 (2013.01); C01B 33/18 (2013.01); C09C 1/30 (2013.01); G03G 9/0819 (2013.01); G03G 9/0827 (2013.01); G03G 9/09716 (2013.01); G03G 9/09725 (2013.01); *C01P 2004/32* (2013.01); *C01P 2006/10* (2013.01); *C01P 2006/11* (2013.01); *C01P 2006/12* (2013.01); *C01P 2006/80* (2013.01); *C01P 2006/90* (2013.01)

(58) Field of Classification Search
None
See application file for complete search history.

(56) References Cited

U.S. PATENT DOCUMENTS

| 8,691,483 B2 * | 4/2014 | Yasutomi ............. G03G 9/0819 430/108.1 |
| 2003/0077533 A1 * | 4/2003 | Murota ................. C09C 1/3081 430/108.3 |
| 2006/0171872 A1 * | 8/2006 | Adams ................. C09C 1/3081 423/335 |
| 2014/0141370 A1 * | 5/2014 | Sasaki ............... G03G 9/09725 430/111.4 |

FOREIGN PATENT DOCUMENTS

| EP | 1249474 A1 | 10/2002 |
| JP | 05346682 A | 12/1993 |
| JP | 2000081723 A | 3/2000 |
| JP | 2000264621 A | 9/2000 |
| JP | 2002023414 A | 1/2002 |
| JP | 2004067475 A | 3/2004 |
| JP | 2007171713 A | 7/2007 |
| WO | 2013018704 A1 | 2/2013 |

OTHER PUBLICATIONS

Machine translation JP 2007-171713. (Year: 2007).*
English language abstract for JP 05346682 A (1993).
English language abstract for JP 2000081723 A (2000).
English language abstract for JP 2000264621 A (2000).
English language abstract for JP 2002023414 A (2002).
English language abstract for JP 2004067475 A (2004).
English language abstract for JP 2007171713 A (2007).
International Search Report from PCT/JP2015/071159 dated Aug. 28, 2015.

* cited by examiner

*Primary Examiner* — Alexandre F Ferre
(74) *Attorney, Agent, or Firm* — Caesar Rivise, PC

(57) ABSTRACT

Provided is an external additive for toner, which is suitable for producing a toner having excellent storage stability and chargeability. A silica fine powder suitable for being added to the external additive for toner is also provided. The silica fine powder has a specific surface area of 15 $m^2$/g or more and 90 $m^2$/g or less, a loose bulk density of 0.09 $g/cm^3$ or more and 0.18 $g/cm^3$ or less, a carbon content of 0.25 wt % or more and 0.90 wt % or less, and a hydrophobicity of 60% or more and 75% or less. It is preferable that a ratio (A)/(B) of the loose bulk density of the silica fine powder after surface treatment (A) to a loose bulk density of the silica fine powder before the surface treatment (B) be 1.05 or more and 1.60 or less.

12 Claims, No Drawings

SILICA FINE POWDER AND USE THEREOF

CROSS-REFERENCE TO RELATED APPLICATIONS

This application is a U.S. National Phase Application of PCT/JP2015/071159, filed Jul. 24, 2015, which claims priority to JP App. No. 2014-151018, filed Jul. 24, 2014, the contents of which applications are incorporated herein by reference in their entireties for all purposes.

TECHNICAL FIELD

The present invention relates to a silica fine powder and the use thereof. In particular, the present invention relates to a hydrophobized spherical silica fine powder and the use thereof.

BACKGROUND ART

In electrostatic charge image developing toners used in devices such as digital copying machines and laser printers, surface-treated silica fine powders have hitherto been used as external additives for toners for the purpose of improving the fluidity of the toners or stabilizing the charging property of the toners. These silica fine powders are required to have high hydrophobicity for the purpose of reducing the charge amount variation due to humidity and to be low in aggregation and high in dispersion for the purpose of uniformly covering the surface of the toners. With respect to the specific surface area of the silica fine powders, ultrafine powders having a specific surface area of approximately 200 to 500 $m^2/g$ are used; however, it has been verified that when the image formation is repeated, the silica ultrafine powders are embedded in the surface of the toner particles, thus for example, the fluidity, the triboelectric charge amount and the transferability of the toner are degraded, and image failure is caused.

There is a method in which an inorganic fine powder having specific surface area of less than 80 $m^2/g$ and accordingly a relatively large particle size is used in combination in order to reduce the embedment of the silica ultrafine powder (Patent Literature 1, Patent Literature 2 and Patent Literature 3). An inorganic fine powder having a relatively large particle size develops a spacer effect to reduce the stress caused by the mutual direct contact of the toner particles. Accordingly, for example, a method for achieving an elongation of the operating life of a toner by suppressing the embedment of the silica ultrafine powder has been adopted.

However, an inorganic fine powder having a relatively large particle size tends to be smaller in charge amount as compared with an ultrafine powder, and causes the decrease of the charge amount when the external addition amount of such an inorganic fine powder is increased for the purpose of improving the spacer effect. Moreover, recently, because of the acceleration of the low-temperature fixing of the toner, when the toner is stored over a long term, there has been a growing problem of the degradation of the storage stability of the toner due to the mutual blocking of the toner particles. Accordingly, the storage stability and the chargeability of the fine powder having a relatively large particle size have been demanded to be further improved.

CITATION LIST

Patent Literature

Patent Literature 1: Japanese Patent Laid-Open No. H05-346682

Patent Literature 2: Japanese Patent Laid-Open No. 2000-81723

Patent Literature 3: Japanese Patent Laid-Open No. 2004-67475

SUMMARY OF INVENTION

Technical Problem

An object of the present invention is to provide an external additive for toner, suitable for preparing a toner excellent in storage stability and chargeability, and to provide a silica fine powder suitable for being added to the external additive for toner.

Solution to Problem

The present inventors advanced a diligent study in order to achieve the above-described object, and discovered a silica fine powder achieving the aforementioned object. The present invention is based on such knowledge, and has following gist.

(1) A hydrophobized spherical silica fine powder, obtained by surface treating a spherical silica fine powder with hexamethyl disilazane, wherein the hydrophobized spherical silica fine powder has a specific surface area of 15 $m^2/g$ or more and 90 $m^2/g$ or less, a loose bulk density of 0.09 $g/cm^3$ or more and 0.18 $g/cm^3$ or less, a carbon content of 0.25 wt % or more and 0.90 wt % or less, and a hydrophobicity of 60% or more and 75% or less.

(2) The hydrophobized spherical silica fine powder according to (1), wherein a ratio (A)/(B) of the loose bulk density of the hydrophobized spherical silica fine powder after the surface treatment (A) to a loose bulk density of the spherical silica fine powder before the surface treatment (B) is 1.05 or more and 1.60 or less.

(3) The hydrophobized spherical silica fine powder according to (1) or (2), wherein the spherical silica fine powder is obtained by allowing metal silicon and oxygen to react with each other.

(4) An external additive for toner for electrostatic charge image development, including the hydrophobized spherical silica fine powder according to any one of (1) to (3).

(5) A silica fine powder having a specific surface area of 15 $m^2/g$ or more and 90 $m^2/g$ or less, a loose bulk density of 0.09 $g/cm^3$ or more and 0.18 $g/cm^3$ or less, a carbon content of 0.25 wt % or more and 0.90 wt % or less, and a hydrophobicity of 60% or more and 75% or less.

(6) The silica fine powder according to (5), wherein an average sphericity is 0.80 or more.

(7) The silica fine powder according to (5) or (6), having alkyl groups on a surface thereof.

(8) The silica fine powder according to (5) or (6), having trimethylsilyl groups on the surface thereof.

(9) The silica fine powder according to any one of (5) to (8), having a water content of 0.03 wt % or more and 0.50 wt % or less.

(10) An external additive for toner for electrostatic charge image development, including the silica fine powder according to any one of (5) to (9).

(11) An electrostatic charge image developing toner, including the external additive for toner for electrostatic charge image development according to (4) or (10).

Advantageous Effects of Invention

According to the present invention, an external additive for toner suitable for preparing a toner excellent in storage stability and chargeability is provided. Silica fine powder suitable for the external additive for toner is also provided.

DESCRIPTION OF EMBODIMENTS

Hereinafter, the present invention is described in detail.

The silica fine powder of the present invention is required to have a specific surface area of 15 m$^2$/g or more and 90 m$^2$/g or less. When the specific surface area is less than 15 m$^2$/g, the charge amount of the silica fine powder itself is small, and the chargeability is insufficient when the silica fine powder is used for the external additive for toner. On the other hand, when the specific surface area exceeds 90 m$^2$/g, increased is the fraction of the silica fine powder particles having sizes not contributing to the prevention of the mutual blocking of the toner particles, and storage stability cannot be improved in case where the silica fine powder is used for the external additive for toner. The specific surface area is preferably 20 m$^2$/g or more and 75 m$^2$/g or less and more preferably 25 m$^2$/g or more and 60 m$^2$/g or less.

The specific surface area of the silica fine powder of the present invention is a value based on the BET method, and is determined by using a specific surface area meter "Macsorb HM model-1208" manufactured by Mounteck Inc., on the basis of the BET one-point method. In advance of the measurement, the silica fine powder was pretreated by heating in a nitrogen gas atmosphere at 300° C. for 18 minutes. As the adsorption gas, a gas mixture composed of 30% of nitrogen and 70% of helium was used, and the flow rate of the adsorption gas was regulated in such a way that the indicated value of the flow meter of the main unit was 25 ml/min.

The loose bulk density of the silica fine powder of the present invention is required to be 0.09 g/cm$^3$ or more and 0.18 g/cm$^3$ or less. When the loose bulk density is less than 0.09 g/cm$^3$, there is a possibility that portions undergoing insufficient surface treatment are present, and the improvement effect of the chargeability is liable to be insufficient. On the other hand, when the loose bulk density exceeds 0.18 g/cm$^3$, in case where the silica fine powder is used as the external additive for toner, it is difficult to allow the silica fine powder to uniformly attach to the toner surface, and the improvement effect of the storage stability is insufficient. The loose bulk density is preferably 0.10 g/cm$^3$ or more and 0.17 g/cm$^3$ or less and more preferably 0.11 g/cm$^3$ or more and 0.16 g/cm$^3$ or less.

The loose bulk density of the silica fine powder of the present invention is determined by using a powder tester ("Model PT-E") manufactured by Hosokawa Micron Corp. In a 100-cm$^3$ cup for the bulk density measurement, the silica fine powder was fed from a height of 25 cm in a free fall manner at a charging rate of 5 to 10 g per 1 minute, until the silica fine powder overflows from the cup, the portion above the brim was leveled off, then the weight of the silica fine powder was measured, and thus the loose bulk density was determined.

The silica fine powder of the present invention is required to have a carbon content of 0.25 wt % or more and 0.90 wt % or less. The carbon content represents the attached amount in terms of the carbon content of hexamethyl disilazane on the surface of the silica fine powder. When the carbon content is less than 0.25 wt %, the attached amount of hexamethyl disilazane on the surface of the silica fine powder is small; accordingly, in case where the silica fine powder is used as the external additive for toner, the suppression effect of the cohesion force between the toner particles is insufficient, and the improvement effect of the storage stability is small. On the other hand, when the carbon content exceeds 0.90 wt %, the attached amount of hexamethyl disilazane on the surface of the silica fine powder is excessive, hence the chargeability of silica is liable to be degraded, and the chargeability is also adversely affected when the silica fine powder is used as the external additive for toner. The carbon content is preferably 0.30 wt % or more and 0.70 wt % or less and more preferably 0.35 wt % or more and 0.50 wt % or less.

The carbon content of the silica fine powder of the present invention is determined by using a simultaneous carbon/sulfur determinator "CS-444LS" manufactured by LECO Corp., on the basis of the calibration curve prepared by using the standard sample of the 63 Carbon steel in Japanese Iron and Steel Reference Materials. The charged amount of the silica fine powder was set to be 0.05 g, metal iron (IRON CHIP manufactured by LECO Corp.) and metal tungsten (CECOCEL II manufactured by LECO Corp.) were used as the combustion improvers, and the combustion was performed in oxygen having a purity of 99.5 vol % or more to measure the carbon content.

The silica fine powder of the present invention preferably has a hydrophobicity of 60% or more and 75% or less. When the hydrophobicity is less than 60%, in case where the silica fine powder is used as the external additive for toner, the silica fine powder is affected by the humidity, and the improvement effect of the chargeability is insufficient. On the other hand, when the hydrophobicity exceeds 75%, there is a possibility that in the silica fine powder, there are positions where hexamethyl disilazane is unevenly distributed. Such portions tend to be aggregates, it is difficult to allow the silica fine powder to attach to the toner surface in case where the silica fine powder is used as the external additive for toner, and the storage stability cannot be sufficiently improved. The hydrophobicity is more preferably 65% or more and 73% or less.

The hydrophobicity of the silica fine powder of the present invention is determined by the following method. Specifically, 50 ml of ion-exchanged water and 0.2 g of a sample are placed in a beaker, and methanol is dropwise added to the resulting mixture from a burette under stirring with a magnetic stirrer. With the increase of the methanol concentration in the beaker, the powder is gradually precipitated, and the hydrophobicity (%) is defined by the volume percentage of the methanol in the mixed solution of methanol and the ion-exchanged water at the end point when the total amount of the powder is precipitated.

The silica fine powder of the present invention preferably has a "spherical shape." The "spherical shape" means that the average sphericity of the particles each having 0.050 μm or more in the diameter of a corresponding circle having the same projected area is 0.75 or more; the degree of the "spherical shape" is preferably such that the average sphericity of the particles each having 0.050 μm or more in the diameter of a corresponding circle having the same projected area is 0.80 or more. When the average sphericity is 0.80 or more, the dispersibility is improved, and it is possible to obtain a toner having a satisfactory storage stability in case where the silica fine powder is used as the external additive for toner.

The average sphericity of the silica fine powder of the present invention is determined by the following method. After the silica fine powder was fixed on the sample stage with a carbon paste, it was subjected to osmium coating and then an image of the silica fine powder taken at a magnification of 100,000 and a resolution of 2048×1356 pixels with a scanning electron microscope "Model JSM-6301F" manufactured by JEOL Ltd. was taken into a personal computer. In the image, the particles were recognized by using an image analyzer apparatus "MacView Ver.4" manufactured by Mounteck Inc. and a simple retrieving tool; thus, the sphericity of each particle was determined from the projected area (A) and the perimeter (PM) of the particle. When the area of the perfect circle corresponding to the perimeter (PM) is represented by (B), the sphericity of the particle is given by A/B; when a perfect circle having the same perimeter as the perimeter (PM) of the sample is assumed, $PM=2\pi r$ and $B=\pi r^2$, hence $B=\pi \times (PM/2\pi)^2$, and the sphericity of each of the particles is given by the sphericity=A/B=A×4π/(PM)². The average sphericity was determined as the average value of the sphericities thus obtained for arbitrary 200 particles each having 0.050 µm or more in the diameter of a corresponding circle having the same projected area.

In the silica fine powder of the present invention, the ratio (A)/(B) of the loose bulk density of the silica fine powder after the surface treatment (A) to the loose bulk density of the silica fine powder before the surface treatment (B) is preferably 1.05 or more and 1.60 or less. The ratio (A)/(B) indicates the degree of formation of the aggregated particles due to the surface treatment of the silica fine powder; when the ratio (A)/(B) is 1.05 or more and 1.60 or less, it is possible to further enhance the storage stability and the chargeability effect of the present invention. The ratio (A)/(B) exceeding 1.60 indicates a remarkable formation of the aggregated particles due to the surface treatment; when such a silica fine powder is used as the external additive for toner, the number of the silica fine powder particles attaching to the surface of the toner is decreased, and the improvement effect of the storage stability is insufficient. On the other hand, the ratio (A)/(B) is less than 1.05 indicates a possibility that insufficiently surface treated portions are present although the formation of the aggregated particles is scarce, and the improvement effect of the chargeability is liable to be insufficient. The ratio (A)/(B) is preferably 1.10 or more and 1.40 or less. The loose bulk density of the silica fine powder before the surface treatment is determined by the same method as for the loose bulk density of the above-described silica fine powder.

The silica fine powder of the present invention is preferably obtained by allowing metal silicon to react with oxygen to obtain a silica fine powder, which is then subjected to surface treatment with a hydrophobizing agent such as hexamethyl disilazane. The silica fine powder treated with a hydrophobizing agent such as hexamethyl disilazane can have alkyl groups on the surface thereof, preferably can have trimethyl silyl groups on the surface thereof. Examples of the hydrophobizing agent include, but not limited to: silazane compounds such as hexamethyl disilazane, N-methyl-hexamethyl disilazane, N-ethyl-hexamethyl disilazane, hexamethyl-N-propyl disilazane, hexaethyl disilazane, hexapropyl disilazane, 1,3-diethyl-1,1,3,3-tetramethyl disilazane and 1,3-dimethy-1,1,3,3-tetraethyl disilazane; because of being satisfactory in reactivity, more preferable are trimethylsilylating agents such as hexamethyl disilazane, N-methyl-hexamethyl disilazane, N-ethyl-hexamethyl disilazane, hexamethyl-N-propyl disilazane, and more preferable is hexamethyl disilazane. The silica fine powder obtained by the oxidation reaction of metal silicon tends to be easily obtained as particles high in sphericity, scarcely undergoes the mixing of structure-forming particles or coalesced particles, hence is excellent in dispersibility and low in moisture content, and accordingly can yield a toner excellent in storage stability and chargeability in case where the silica fine powder is surface-treated with a hydrophobizing agent such as hexamethyl disilazane and used as an external additive for toner. Examples of the method for producing a spherical silica fine powder include: a method in which metal silicon is placed in a high-temperature field formed by, for example, chemical flame or an electric furnace, and is made spherical while undergoing the oxidation reaction (for example Japanese Patent No. 1568168); and a method in which a metal silicon particle slurry is sprayed into a flame and is made spherical while undergoing oxidation (for example Japanese Patent Laid-Open No. 2000-247626). In an embodiment, the moisture content of the silica fine powder according to the present invention can be 0.03 wt % or more and 0.50 wt % or less. The moisture content is preferably 0.05 wt % or more and 0.40 wt % or less. The moisture content is determined by the Karl-Fischer method. For the Karl-Fischer measurement, a moisture vaporizing device VA-122 manufactured by Mitsubishi Chemical Corp. and a moisture measurement device CA-100 manufactured by Mitsubishi Chemical Corp. were used, Aquamicron AX (manufactured by Mitsubishi Chemical Corp.) was used for the anode solution of the moisture measurement device, and Aquamicron CXU (manufactured by Mitsubishi Chemical Corp.) was used for the cathode solution of the moisture measurement device. In the Karl-Fischer measurement, the background value was fixed at 0.20 (µg/sec), and the measurement was continuously performed until the detected moisture content came to fall below the background value. The silica fine powder was not exposed to the outside air during the heat treatment with the electric heater of the moisture vaporizing device, the moisture generated from the moisture vaporizing device was entrained by highly pure argon at 300 ml/min to be introduced into the Karl-Fischer device, and thus the moisture amount was determined. In the present invention, the silica fine powder was allowed to stand still for 24 hr under the conditions of a temperature of 25° C. and a relative humidity of 55%, then the silica fine powder was placed in the device, and the moisture content was derived from the moisture amount generated until the heating temperature of the electric heater of the moisture vaporizing device reached 200° C.

The method for surface treating the silica fine powder by using a hydrophobizing agent such as hexamethyl disilazane is described. The silica fine powder of the present invention is characterized by being remarkably suppressed in the increase of the loose bulk density due to the surface treatment, because the attached amount of the hydrophobizing agent such as hexamethyl disilazane to the silica fine powder surface is small although a high hydrophobicity is achieved, on the ground that the surface thereof is uniformly covered with a hydrophobizing agent such as hexamethyl disilazane; in order to obtain the silica fine powder of the present invention, a hydrophobizing agent such as hexamethyl disilazane is not sprayed in a form of liquid, but is preferably brought into contact, in a state of being gasified, with the silica fine powder. By allowing the hydrophobizing agent, in a state of being gasified, to react with the silica fine powder, it is made possible to uniformly cover the silica fine powder surface with the hydrophobizing agent, and thus, in case where the silica fine powder is used as the external additive for toner, the storage stability can be improved. By allowing moisture to be present on the silica fine powder surface in advance before the hydrophobizing agent such as hexamethyl disilazane is brought into contact with the silica fine powder, the silanol group is activated, and it is made possible to allow a hydrophobizing agent such as hexamethyl disilazane to bond to the silica fine powder surface with a high reaction rate, and thus, in case where the silica fine powder is used as the external additive for toner, the chargeability can be improved. When moisture is allowed to be present on the silica fine powder surface, it is preferable to bring the moisture, in a state of being gasified, into contact with the silica fine powder. When the silica fine powder surface-treated with a hydrophobizing agent such as hexamethyl disilazane has a hydrophobicity lower than the intended hydrophobicity, it may be possible to repeat an operation of performing the surface treatment with a hydrophobizing agent such as hexamethyl disilazane after the silica fine powder is brought into contact with moisture, until the intended hydrophobicity is obtained. In order to obtain the silica fine powder of the present invention, the addition amount of water in each time of surface treatment is preferably 0.5 mg to 1.5 mg per 1 $m^2$ of the silica fine powder, and the addition mount of the hydrophobizing agent such as hexamethyl disilazane is preferably 0.8 mg to 2.5 mg per 1 $m^2$ of the silica fine powder. By performing the surface treatment by these above-described methods, it is made possible to obtain the silica fine powder of the present invention. The addition amounts of water and the hydrophobizing agent such as the hexamethyl disilazane per 1 $m^2$ of the silica fine powder are determined as follows: the specific surface area ($m^2$/g) of the silica fine powder is determined by the above-described BET method, the surface area of the whole of the silica fine powder is determined from the weight of the silica fine powder used, the addition amounts of the hydrophobizing agent such as hexamethyl disilazane and water in each time of surface treatment are divided by the surface area, and thus the aforementioned addition amounts are obtained.

The silica fine powder of the present invention may be surface treated with a single hydrophobizing agent such as hexamethyl disilazane, or may also be surface treated with two or more surface treatment agents by combining hexamethyl disilazane with other surface treatment agents. For example, in order to impart positive chargeability, when the hydrophobizing agent is used in combination with an aminosilane coupling agent, first the silica fine powder is subjected to an aminosilane treatment, and then the hydrophobization treatment of the present invention may be performed. When the aminosilane treatment is performed, preferable is a method in which the aminosilane coupling agent in a state of being gasified is brought into contact with the silica fine powder.

The mixing amount of the silica fine powder of the present invention in a toner is usually preferably 0.3 to 5 parts by mass and further preferably 0.5 to 4 parts by mass in relation to 100 parts by mass of the toner. When the mixing amount is too small, the attached amount of the silica fine powder to the toner is small and no sufficient storage stability improvement effect is obtained, and when the mixing amount is too large, the silica fine powder is liable to be detached from the toner surface.

For the silica powder of the external additive for toner including the silica fine powder of the present invention, the silica fine powder of the present invention is not necessarily used alone; for example, the silica fine powder of the present invention can also be used in combination with a silica ultrafine powder being high in fluidity imparting effect, and having a specific surface area of approximately 200 to 500 $m^2$/g.

As the electrostatic charge image developing toner to which the external additive for toner including the silica fine powder of the present invention is added, heretofore known electrostatic charge image developing toners each mainly composed of a binding resin and a colorant can be used. A charge controlling agent may also be added to the toner if necessary.

The electrostatic charge image developing toner to which the external additive for toner including the silica fine powder of the present invention is added can be used as a one-component developer, and can also be used as a two-component developer when mixed with a carrier. When used as a two-component developer, the above-described external additive for toner is not beforehand added to the toner particles, but may be added for covering the toner surface at the time of mixing of the toner with the carrier. As the carrier, an iron powder and the like, the surface of which may be coated with resin, and other heretofore known carries are used.

EXAMPLES

Hereinafter, the present invention is described in more detail by way of Examples and Comparative Examples.

Examples 1 to 14 and Comparative Examples 1 to 10

A spherical silica fine powder was produced by using an apparatus in which a LPG-oxygen mixing type burner having a double tube structure capable of forming inner flame and outer flame was disposed at the top of a combustion furnace, and a collecting system line was directly connected to the lower part. In the central part of the above-described burner, further a two-fluid nozzle for spraying a slurry was disposed, and a slurry (metal silicon concentration: 10 to 70 mass %) composed of a metal silicon powder (average particle size: 10.5 μm) and water was jetted from the central part of the nozzle at a feed rate of 2 to 30 L/hr. From the surrounding of the nozzle, oxygen was supplied. The formation of the flames was performed by providing a few tens of pores at the outlet of the double tube burner, and by jetting a mixed gas composed of LPG and oxygen from the pores. The spherical silica fine powder produced by jetting from the two-fluid nozzle and passing through the flames was air transported in the collecting line by a blower, and collected by a bag filter. The regulation of the specific surface area of the spherical silica fine powder was performed by the regulation of the slurry concentration, the slurry feed rate and the LPG flow rate. Specifically, when the specific surface area was made smaller, the specific surface area was regulated by increasing the slurry concentration, the slurry feed rate and the LPG flow rate. On the other hand, when the specific surface area was made larger, the specific surface area was regulated by decreasing the slurry concentration, the slurry feed rate and the LPG flow rate.

By appropriately mixing these various spherical silica fine powders, spherical silica fine powders having various specific surface areas and various loose bulk densities were obtained. In a stainless steel cylindrical vessel of 250 mm in diameter, 500 g of each of the obtained spherical silica fine powders was set. On the outer circumference of the stainless steel cylindrical vessel, a ribbon heater was disposed, a 20-μm metal gauze for uniformly feeding the gas was fitted to the lower inlet, and a filter cloth for preventing the powder from scattering to outside the system was fitted to the upper outlet. First, the ribbon heater was operated to maintain the internal temperature so as to be 135° C. to 150° C. Subsequently, while the spherical silica fine powder was being fluidized by feeding a flow of nitrogen gas circulated by a suction blower from the lower inlet of the vessel at a flow rate of 150 NL/min, water was fed to the lower section of the vessel and gasified such that the amount of the water was 0.3 mg to 1.8 mg per 1 $m^2$ of the spherical silica fine powder, and the gasified water was entrained by the circulating nitrogen gas so as to be brought into contact with the spherical silica fine powder. After the elapsed time of 5 minutes from the contact with water, hexamethyl disilazane ("SZ-31" manufactured by Shin-Etsu Chemical Co., Ltd.) was fed and gasified such that the amount of the hexamethyl disilazane was 0.5 mg to 3.0 mg per 1 $m^2$ of the silica fine powder, and the gasified hexamethyl disilazane was entrained by the circulating nitrogen gas so as to be brought into contact with the spherical silica fine powder. The feed rates of water and hexamethyl disilazane to the lower section of the vessel were each set to be 2.0 g/sec. The powder was collected after the elapsed time of 10 minutes from the contact with hexamethyl disilazane. By repeating this operation one to five times, the hydrophobized spherical silica fine powders A to U were obtained. Of the hydrophobized spherical silica fine powders A to U, except for Q and U, the addition amount of water in each time of the surface treatment was within a range from 0.5 mg to 1.5 mg per 1 $m^2$ of the spherical silica fine powder, and the addition amount of hexamethyl disilazane in each time of the surface treatment was within a range from 0.8 mg to 2.5 mg per 1 $m^2$ of the spherical silica fine powder; in the cases of Q and U, water and hexamethyl disilazane were added outside the aforementioned ranges. The regulation of the loose bulk density, the carbon content and the hydrophobicity was performed by regulating the number of repetition of the water and hexamethyl disilazane treatments, and by regulating the addition amounts of water and hexamethyl disilazane per each time of treatment.

In addition, as Comparative Examples, hydrophobized spherical silica fine powders V to X were each obtained under the conditions that the above-described stainless steel cylindrical vessel was set at normal temperature, water was liquid sprayed from the upper section of the vessel, hexamethyl disilazane was liquid sprayed after 5 minutes from the water spray, the spherical silica fine powder was allowed to flow for 10 minutes from the liquid spray of hexamethyl disilazane, and then the powder was collected. The liquid spray rates of water and hexamethyl disilazane were each set to be 2.0 g/sec. The loose bulk density, the carbon content and the hydrophobicity were regulated by regulating the spray amount of water within a range from 0.6 mg to 1.2 mg per 1 $m^2$ of the spherical silica fine powder, and by regulating the spray amount of hexamethyl disilazane within a range from 1.0 mg to 2.0 mg per 1 $m^2$ of the spherical silica fine powder.

Tables 1 and 2 show, for each of the obtained hydrophobized spherical silica fine powders, the specific surface area, the loose bulk density, the carbon content, the hydrophobicity, and the ratio (A)/(B) of the loose bulk density of the hydrophobized spherical silica fine powder after the surface treatment (A) to the loose bulk density of the spherical silica fine powder before the surface treatment (B). It is to be noted that the average sphericity and the moisture content of each of the obtained hydrophobized spherical silica fine powders A to X were 0.85 or more and within a range of 0.05 wt % or more and 0.40 wt % or less, respectively.

In order to evaluate the properties of the hydrophobized spherical silica fine powders A to X as the external additive for toner, the storage stability and the chargeability of each of the hydrophobized spherical silica fine powders A to X were determined according to the following methods. The results thus obtained are shown in Tables 1 and 2.

(1) Storage Stability

In a Henschel mixer (Model "FM-10B" manufactured by Mitsui Miike Engineering Corp.), 15 g of each of the hydrophobized spherical silica fine powders A to X, and 485 g of a resin powder prepared by crushing, with a jet mill, a polyester resin having a glass transition point of 62° C. so as to have an average particle size of 7.5 μm were placed, and mixed at 1000 rpm for 1 minute. In a silicone cup, 10 g of the resulting mixture was measured off, allowed to stand still for 3 hours under the condition of a temperature of 62° C., then transferred gently on a sieve with a mesh opening size of 74 μm, and set on a vibration table of the powder tester (Model "PT-E" manufactured by Hosokawa Micron Corp.). The vibration amplitude of the sieve was set at 1.0 mm, the sieve was vibrated for 30 seconds, and then the mass of the mixture remaining on the sieve was measured. The smaller value of this mass indicates, the better storage stability of the toner.

(2) Chargeability

In the Henschel mixer (Model "FM-10B" manufactured by Mitsui Miike Engineering Corp.), 30 g of each of the hydrophobized spherical silica fine powders A to X, and 970 g of a cross-linked styrene resin powder (trade name "SX-500H" manufactured by Soken Chemical & Engineering Co., Ltd.) having an average particle size of 5 μm were placed, and mixed at 1000 rpm for 1 minute to prepare a pseudo toner. The pseudo toner was allowed to stand still for 24 hours under the conditions of a temperature of 25° C. and a relative humidity of 55%, and then the blow-off charge amount of the pseudo toner was determined by the following method. In a 100-ml polyethylene vessel, 0.20 g of the pseudo toner and 3.80 g of a standard carrier for a negatively charged polar toner ("N-01" distributed by the Imaging Society of Japan) as a carrier were placed and the lid of the vessel was closed, and the vessel was vertically held with hands and shaken 200 times with a stroke of approximately 30 cm at a rate of two shakes/sec. After a 3-minute shaking, by using 0.30 g of the resulting mixture of the pseudo toner and the carrier, the blow-off charge amount was determined with a suction separation-type charge amount measuring instrument ("SepaSoft STC-1" manufactured by Sankyo Pio-Tech Co., Ltd.). The suction time was set to be 3 minutes, the suction pressure was set to be 4.0 kPa, and a metal gauze with a mesh opening size of 32 μm was used as the screen used for the separation of the pseudo toner and the carrier. The larger minus value of the blow-off charge amount indicates, the better chargeability of the toner.

TABLE 1

|  | Examples | | | | | | | |
| --- | --- | --- | --- | --- | --- | --- | --- | --- |
|  | 1 | 2 | 3 | 4 | 5 | 6 | 7 | 8 |
| Symbol for hydrophobized spherical silica fine powder | A | B | C | D | E | F | G | H |

TABLE 1-continued

| | | | | | | | | |
|---|---|---|---|---|---|---|---|---|
| Specific surface area (m²/g) | 38 | 26 | 58 | 24 | 25 | 61 | 21 | 73 |
| Loose bulk density (g/cm³) | 0.13 | 0.16 | 0.11 | 0.16 | 0.17 | 0.10 | 0.18 | 0.12 |
| Carbon content (wt %) | 0.42 | 0.36 | 0.48 | 0.35 | 0.38 | 0.38 | 0.68 | 0.87 |
| Hydrophobicity (%) | 71 | 66 | 73 | 65 | 67 | 66 | 72 | 73 |
| Loose bulk density ratio (A)/(B) | 1.14 | 1.42 | 1.04 | 1.40 | 1.37 | 1.11 | 1.59 | 1.36 |
| Weight on sieve (g) | 1.2 | 1.6 | 1.5 | 1.3 | 1.4 | 1.5 | 2.3 | 1.7 |
| Blow-off charge amount (μC/g) | −46 | −45 | −35 | −41 | −45 | −44 | −39 | −38 |

| | Examples | | | | | |
|---|---|---|---|---|---|---|
| | 9 | 10 | 11 | 12 | 13 | 14 |
| Symbol for hydrophobized spherical silica fine powder | I | J | K | L | M | N |
| Specific surface area (m²/g) | 82 | 20 | 36 | 19 | 65 | 77 |
| Loose bulk density (g/cm³) | 0.10 | 0.17 | 0.17 | 0.17 | 0.13 | 0.09 |
| Carbon content (wt %) | 0.30 | 0.26 | 0.74 | 0.29 | 0.29 | 0.34 |
| Hydrophobicity (%) | 63 | 64 | 75 | 67 | 61 | 62 |
| Loose bulk density ratio (A)/(B) | 1.23 | 1.43 | 1.48 | 1.42 | 1.37 | 1.11 |
| Weight on sieve (g) | 2.0 | 2.3 | 2.2 | 2.4 | 2.3 | 2.2 |
| Blow-off charge amount (μC/g) | −37 | −37 | −40 | −39 | −42 | −37 |

TABLE 2

| | Comparative Examples | | | | | | | | | |
|---|---|---|---|---|---|---|---|---|---|---|
| | 1 | 2 | 3 | 4 | 5 | 6 | 7 | 8 | 9 | 10 |
| Symbol for hydrophobized spherical silica fine powder | O | P | Q | R | S | T | U | V | W | X |
| Specific surface area (m²/g) | 57 | 14 | 16 | 90 | 43 | 92 | 76 | 29 | 78 | 66 |
| Loose bulk density (g/cm³) | 0.10 | 0.17 | 0.20 | 0.10 | 0.12 | 0.10 | 0.08 | 0.21 | 0.19 | 0.20 |
| Carbon content (wt %) | 0.23 | 0.32 | 0.25 | 0.28 | 0.29 | 0.31 | 0.26 | 0.68 | 0.88 | 0.93 |
| Hydrophobicity (%) | 61 | 65 | 60 | 59 | 58 | 64 | 65 | 70 | 78 | 75 |
| Loose bulk density ratio (A)/(B) | 1.06 | 1.42 | 1.63 | 1.22 | 1.08 | 1.28 | 1.11 | 1.76 | 2.16 | 2.15 |
| Weight on sieve (g) | 3.1 | 2.1 | 4.8 | 3.0 | 2.1 | 3.0 | 2.6 | 5.2 | 6.3 | 5.7 |
| Blow-off charge amount (μC/g) | −38 | −27 | −32 | −22 | −27 | −39 | −29 | −42 | −40 | −26 |

As can be seen from a comparison of Examples with Comparative Examples, according to the present invention, there is provided an external additive for toner excellent in storage stability and chargeability. There is also provided a silica fine powder suitable for addition to the external additive for toner.

INDUSTRIAL APPLICABILITY

The silica fine powder of the present invention is used as an external additive for electrophotographic toners used in copying machines, laser printers and the like.

The invention claimed is:

1. A hydrophobized spherical silica fine powder, obtained by surface treating a spherical silica fine powder with hexamethyl disilazane, wherein the hydrophobized spherical silica fine powder has a specific surface area of 15 m²/g or more and 90 m²/g or less, a loose bulk density of 0.09 g/cm³ or more and 0.18 g/cm³ or less, a carbon content of 0.25 wt % or more and 0.90 wt % or less in terms of a carbon content of hexamethyl disilazane, and a hydrophobicity of 60% or more and 75% or less.

2. The hydrophobized spherical silica fine powder according to claim 1, wherein a ratio (A)/(B) of the loose bulk density of the hydrophobized spherical silica fine powder after the surface treatment (A) to a loose bulk density of the spherical silica fine powder before the surface treatment (B) is 1.05 or more and 1.60 or less.

3. The hydrophobized spherical silica fine powder according to claim 1, wherein the spherical silica fine powder is obtained by allowing metal silicon and oxygen to react with each other.

4. An external additive for toner for electrostatic charge image development, comprising the hydrophobized spherical silica fine powder according to claim 1.

5. An electrostatic charge image developing toner, including the external additive for toner for electrostatic charge image development according to claim 4.

6. A silica fine powder having a specific surface area of 15 m²/g or more and 90 m²/g or less, a loose bulk density of 0.09 g/cm³ or more and 0.18 g/cm³ or less, a carbon content of 0.25 wt % or more and 0.90 wt % or less in terms of the carbon content of hexamethyl disilazane, and a hydrophobicity of 60% or more and 75% or less.

7. The silica fine powder according to claim 6, wherein an average sphericity is 0.80 or more.

8. The silica fine powder according to claim 6, having alkyl groups on a surface thereof.

9. The silica fine powder according to claim 6, having trimethylsilyl groups on the surface thereof.

10. The silica fine powder according to claim 6, having a water content of 0.03 wt % or more and 0.50 wt % or less.

11. An external additive for toner for electrostatic charge image development, comprising the silica fine powder according to claim 6.

12. An electrostatic charge image developing toner, including the external additive for toner for electrostatic charge image development according to claim 11.

* * * * *